United States Patent [19]
Plumley et al.

[11] 3,786,741
[45] Jan. 22, 1974

[54] SMOKING AND COOKING APPARATUS

[76] Inventors: Elizabeth Emmett Plumley, 44 Willway Ave.; David A. Brown, 46 Willway Ave., both of Richmond, Va. 23226

[22] Filed: Aug. 4, 1972

[21] Appl. No.: 278,127

[52] U.S. Cl. .......................... 99/447, 99/450, 99/467
[51] Int. Cl. ........................... A47j 37/07, A23b 1/04
[58] Field of Search ..... 99/447, 394, 422, 425, 444, 99/445, 446, 450, 467, 468, 473; 126/14, 25; 220/44

[56] References Cited
UNITED STATES PATENTS

| | | | |
|---|---|---|---|
| 1,862,420 | 6/1932 | O'Brien | 99/447 X |
| 2,413,204 | 12/1946 | Wolff | 99/447 |
| 2,573,719 | 11/1951 | Lebherz | 99/447 X |
| 3,552,302 | 1/1971 | Gilberg | 99/450 X |
| 3,623,423 | 11/1971 | Berger | 99/450 X |
| 3,722,402 | 3/1973 | Plumley | 99/450 X |

*Primary Examiner*—Peter Feldman
*Assistant Examiner*—Arthur O. Henderson
*Attorney, Agent, or Firm*—Burns, Doane, Swecker & Mathis

[57] ABSTRACT

A smoking and cooking apparatus operable to overlay a cooking surface including a closed heat reflective member, support members connected to and downwardly extending from the closed heat reflective member for supporting the member above a cooking surface. The closed heat reflective member in combination with the support members serve to reflect heat onto food cooking upon the cooking surface and to collect smoke above the cooking surface in order to flavor the food. Passages are fashioned laterally through the supporting members to permit circulation within the smoking and cooking apparatus while simultaneously providing a desirable retention of smoke adjacent to the food during the cooking and smoking thereof. The closed heat reflective member and support members may be operatively engageable with a griddle which comprises a generally square heat conductive plate. The plate is fashioned with upwardly extending flange means peripherally extending thereabout for engagement with the support members. During a cooking operation the downwardly extending support members serve to maintain the closed heat reflective member generally above and in a parallel plane with respect to the heat conductive plate to facilitate the cooking and smoking of food upon the plate. After the cooking operation the closed heat reflective and support members may be disconnected from the griddle and inverted to serve as a grease collecting means, attarctive table server and the like. The closed heat reflective and support members in combination with the griddle may be advantageously utilized in combination with a barbecuing grill which is suitable to support a charcoal fire or the like. In this instance the griddle is provided with a plurality of apertures extending through the heat conductive plate to faciliate smoking the food during the cooking operation.

15 Claims, 9 Drawing Figures

PATENTED JAN 22 1974

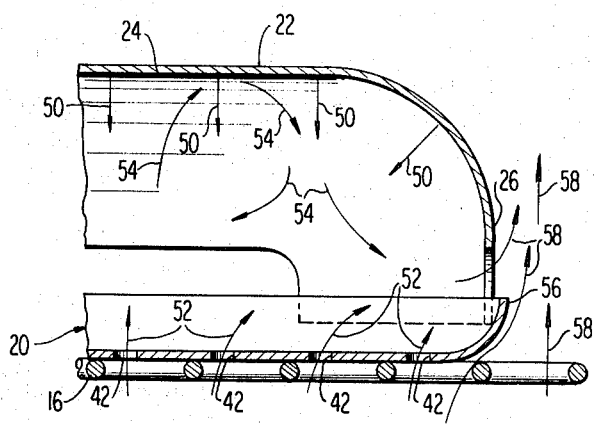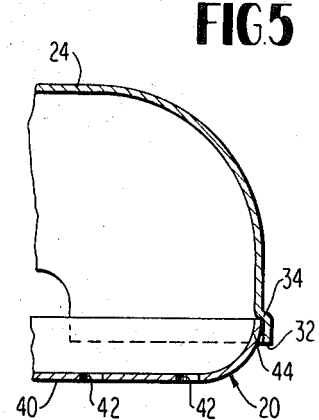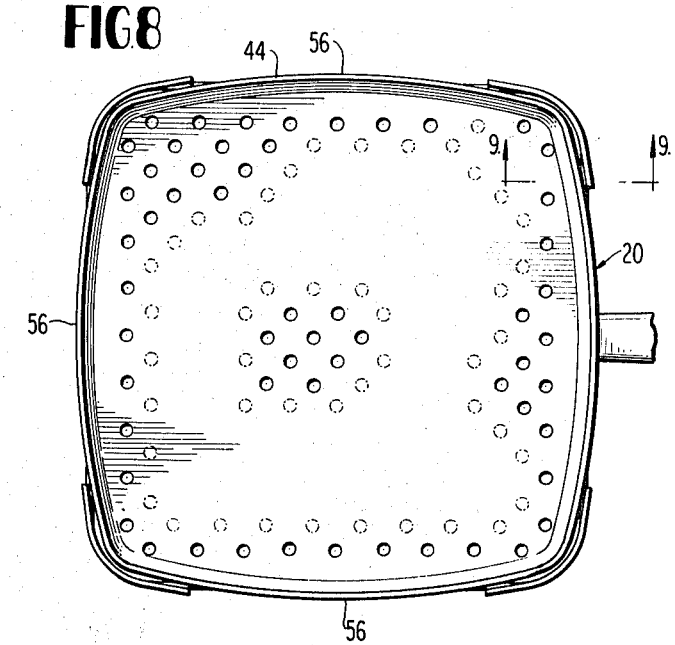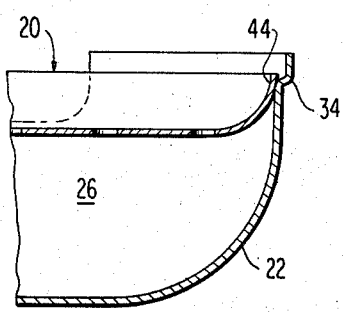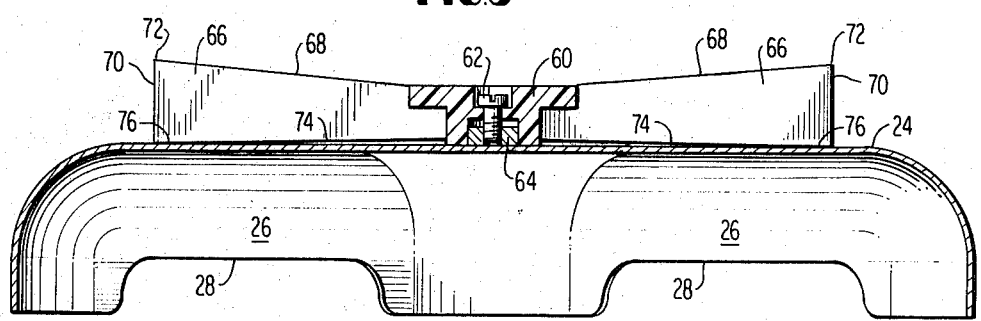

SMOKING AND COOKING APPARATUS

BACKGROUND OF THE INVENTION

This invention relates to a smoking and cooking apparatus. More particularly this invention pertains to a smoking and cooking apparatus of the type which may be advantageously utilized with a barbecuing grill and the like.

In the past it has been common practice to cook food out-of-doors upon an open barbecue grill of the type comprising a generally dish-shaped receptacle for containing burning coals, wood or the like, in combination with a generally planar overlaying grid to support food for cooking. Such cooking devices provide the highly desirable ocular and gastronomical effects of a browned or glazed exterior surface in combination with a somewhat smoky flavor. Although such barbecuing grills have proven to be highly satisfactory and have received considerable commercial attention room for improvement remains.

In this connection while the relatively open planar grid permits smoke to reach the food and also allows flames to lick the cooking food such a surface is not readily amenable to handling of the food items. For example, hamburgers or the like are often dropped into the charcoal bed when an attempt is made to turn or move the food to a cooler or hotter portion of the grill. In the same vein, it is difficult to cook small items upon an open grid.

While it is possible to obviate the above disadvantages by the utilization of a conventional frying pan in connection with a grill, the aforementioned highly desirable ocular and gastronomical features of open grilling are simultaneously eliminated. Moreover, a frying pan tends to collect grease which may impart an undesirable flavor to the food or in extreme instances may ignite and char the food within the pan. It would therefore be high desirable to provide an apparatus which would facilitate handling food to be cooked on an open barbecuing grill without simultaneously eliminating the glazing and smoking qualities of open air cooking.

It has further been appreciated in the past that a barbecuing operation may be facilitated by the provision of a generally dome-shaped cover extending completely over the cooking grid. The cover is provided approximately in the center of the dome with a plurality of apertures to permit smoke to escape from the top of the dome. By the provision of this cover the smoking character of the barbecuing grill is accentuated, the cooking time is diminished, and also the surface of the food is desirably glazed. While such devices, in at least some instances, have proven to be highly advantageous room for significant improvement remains.

In this connection the covers are adapted for use in combination only with a compatibly dimensioned basin. Therefore, the cover is not readily utilizable with a nonconforming grill. Moreover, the aperture in the center of the dome permits the smoke to freely flow upward away from the cooking food without imparting a maximum degree of flavoring to the food. Therefore, it would be highly desirable to provide a smoking and cooking apparatus which would provide the advantages of a dome covered outdoor grill while simultaneously possessing the capability of utilization with a conventional open grill while promoting maximum smoking of the food to be cooked.

It has further been observed that with outdoor grilling oerations there has grown up a substantial amount of paraphernalia which is generally unifunctional. It would therefore be highly desirable to provide a multifunctional cooking and smoking apparatus.

OBJECTS OF THE INVENTION

It is therefore a general object of the invention to obviate or minimize problems and disadvantages of the type previously described.

It is a particular object of the invention to provide a novel smoking and cooking apparatus which will increase the cooking rate of food upon a cooking surface and advantageously smoke the food during the cooking operation.

It is another object of the invention to provide a novel smoking and cooking apparatus adapted to overlay a grill to accentuate the cooking and smoking operation thereof and which may be inverted and stably supported upon a base for utilization as a serving unit.

It is yet another object of the invention to provide a novel smoking and cooking apparatus which may be universally utilized with conventional outdoor charcoal grills.

It is a further object of the invention to provide a novel smoking and cooking apparatus having a handle means wherein heat conduction between the apparatus and the handle is minimized.

It is a further object of the invention to provide a novel smoking and cooking apparatus including a member to facilitate handling a food upon a grill in combination with a means for accentuating smoking and cooking food supported by the device.

It is yet a further object of the invention to provide a novel smoking and cooking apparatus which is multi-functional and may be effectively utilized to smoke and rapidly cook food upon an open grill annd consequently may be utilized as an advantageous food handling and serving piece.

It is still a further object of the invention to provide in combination a novel cooking apparatus including an outdoor charcoal grill and a unit adapted to rest upon the grill for smoking and cooking food in an advantageous manner.

BRIEF SUMMARY:

A preferred embodiment of the invention intended to accomplish at least some of the foregoing objects comprises a smoking and cooking apparatus operable to overlay a cooking surface including a closed heat reflective member, support members connected to and downwardly extending from the closed heat reflective member for supporting the member above a cooking surface. The closed heat reflective member in combination with the support members serve to reflect heat onto food cooking upon the cooking surface and to collect smoke above the cooking surface in order to flavor the food. Passages are fashioned laterally through the supporting members to permit circulation within the smoking and cooking apparatus while simultaneously providing a desirable retention of smoke adjacent to the food during the cooking and smoking thereof.

The closed heat reflective member and support members may be operatively engageable with a griddle which comprises a generally square heat conductive plate. The plate is fashioned with upwardly extending flange means peripherally extending thereabout for engagement with the support members. During a cooking operation the downwardly extending support members serve to maintain the closed heat reflective member generally above and in a parallel plane with respect to the heat conductive plate to facilitate the cooking and smoking of food upon the plate. After the cooking operation the closed heat reflective and support members may be disconnected from the griddle and inverted to serve as a grease collecting means, attractive table server and the like.

The closed heat reflective and support members in combination with the griddle may be advantageously utilized in combination with a barbecuing grill which is suitable to support a charcoal fire or the like. In this instance the griddle is provided with a plurality of apertures extending through the heat conductive plate to facilitate smoking the food during the cooking operation.

THE DRAWINGS

Other objects and advantages of the present invention will become apparent from the following detailed description, taken in conjunction with the accompanying drawings, wherein:

FIG. 3 is a sectional view taken along section line 3—3 in FIG. 1 and particularly illustrates the connecting relationship of a combined handle and base with the upper surface of the smoking and cooking apparatus;

FIG. 5 is a cross-sectional view taken along section line 5—5 in FIG. 2 and particularly discloses the relationship of an inwardly extending ledge of a smoking and cooking apparatus and an upwardly extending flange of a griddle plate;

FIG. 6 is a partial sectional view taken along section line 6—6 in FIG. 1, and particularly discloses by flow arrows the path which may be taken by smoke within the smoking and cooking apparatus;

FIG. 7 is a pictorial illustration of the cooking and smoking apparatus inverted with respect to the griddle into a supporting posture whereby the smoking and cooking apparatus may serve as a grease collection tray, serving unit and the like;

FIG. 8 is a plan view of the griddle supported within the smoking and cooking apparatus as pictorially illustrated in FIG. 7; and FIG. 9 is a sectional view taken along section line 9—9 in FIG. 8 and discloses the supporting relationship of the griddle within the inverted smoking and cooking apparatus.

DETAILED DESCRIPTION OF THE INVENTION

Figure 1:
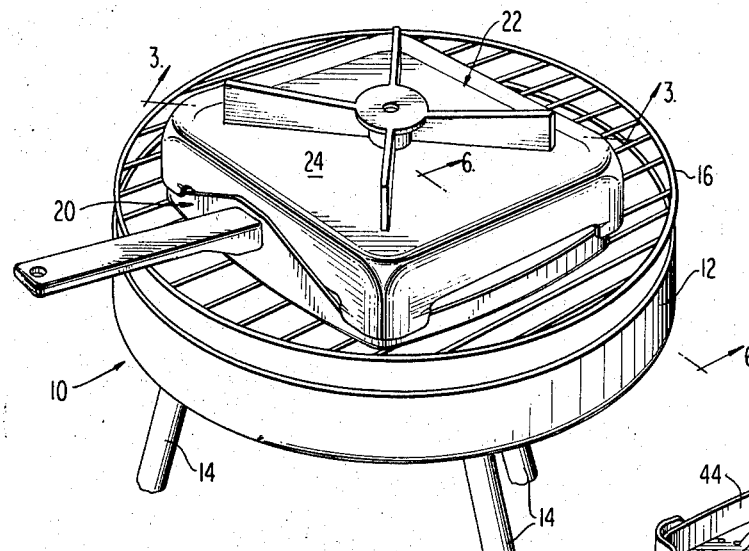
FIG. 1 is a pictorial illustration of an outdoor barbecuing grill, a griddle positioned upon the top of a planar grid of the grill and a smoking and cooking apparatus overlaying the griddle.

Referring now to FIG. 1 there will be seen a conventional outdoor barbecuing grill 10 including a generally dish-shaped basin 12 suitable for supporting charcoal, wood or the like in a conventional manner. The basin 12 is supported by a plurality of legs 14 above a ground surface, not shown. Positioned above the open mouth of the basin 12 is a wire metal gridwork 16 of a conventional type which may be supported upon a central normally extending post (not shown) that is in turn connected for vertical adjustment to a central portion of the basin 12.

In the past, as previously noted, food to be barbecued would be laid directly on the wire grid 16 to be cooked and smoked by the coals within the basin. It will be readily apparent that small items will tend to fall between the openings in the gridwork and generally present difficulties in handling.

Such difficulties are overcome by the present invention which includes a griddle 20 operable to be positioned upon the upper surface of the grid 16 and a smoking and cooking cover operable to overlay the griddle 20 functionally in a manner to be discussed in detail hereinafter.

Figure 2:
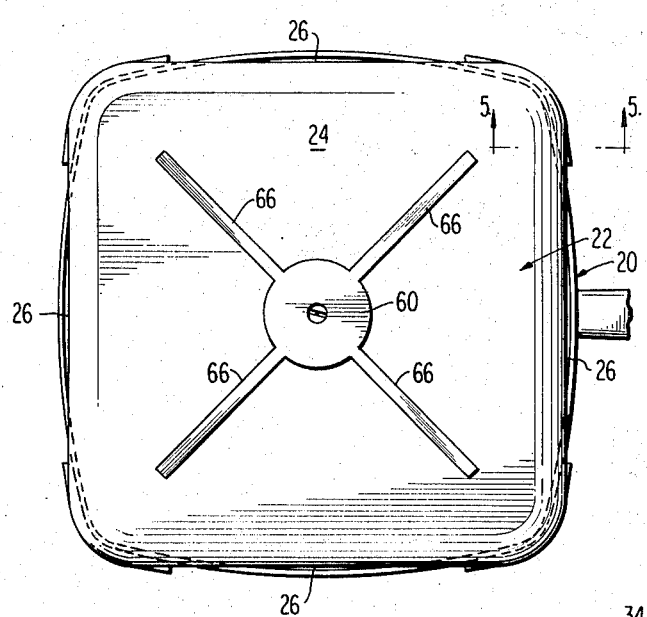
FIG. 2 is a plan view of the cooking and smoking apparatus positioned upon the griddle and particularly discloses the interconnecting relationship thereof.
Figure 4:
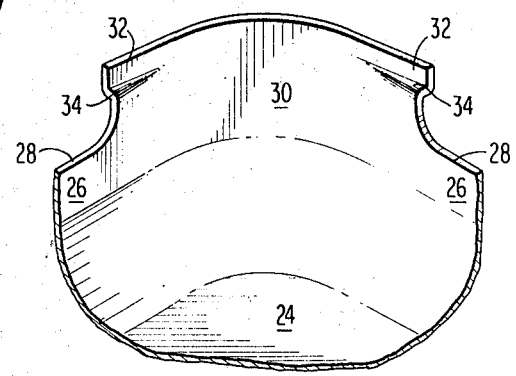
FIG. 4 is a pictorial segmental view of one corner of the smoking and cooking apparatus in an inverted posture and particularly illustrates inwardly extending ledges adjacent the edges of support members for abutting connection with an upwardly extending flange of the griddle as illustrated in FIG. 1.

Referring to FIGS. 2–4 it will be seen that the smoking and cooking cover 22 includes a closed heat reflective member 24 comprising a generally planar plate. As particularly seen in FIG. 2, the plate 24 is generally dimensionally coextensive with the underlaying griddle configuration and in the illustrated instance is equilateral.

The plate 24 has connected to the edges thereof downwardly extending side walls 26. The side walls 26 are slopingly joined to the edges of the planar member 24. The junction of adjacent side walls 26 are also rounded to be compatible with the corners of griddle 20, note particularly FIGS. 2 and 4.

The side walls 26 are each provided across approximately the midspan of the lower edge thereof with a recessed portion 28. The midspan recesses 28 stop short of the corners thus leaving at each of the corners of the cover 22 an extended portion 30 which is generally rounded for pleasing appearance and compatible engagement with the corners of a griddle 20.

Adjacent the outermost edges 32 of the curved corner portions 30 are inwardly displaced ledges 34, note FIG. 5. The ledges are suitably dimensioned to engage with an upper edge of a corner flange portion of the griddle 20.

Figure 7:
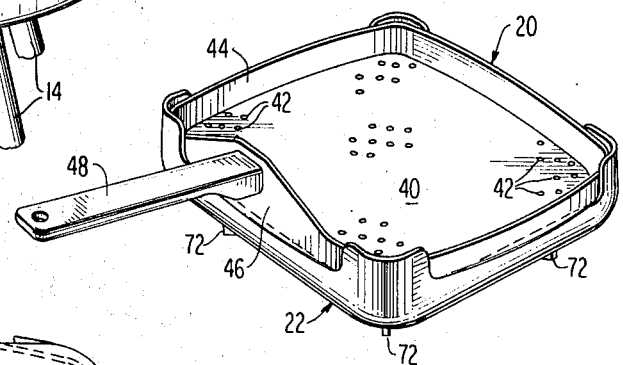

The griddle 20, note FIG. 7, includes a generally planar heat conductive cooking plate 40, having an upper surface for supporting food and a lower surface for resting upon the grid 16 of the grill 10. A plurality of apertures 42 are formed through the plate 40 to permit cooking grease to fall into the fire and thus produce smoke which will pass upwardly through the cooking plate for entrapment beneath the cooking and smoking cover 22. The plate 40 is provided with an upwardly extending peripheral flange 44 which is suitable to be engaged at the corner portions thereof by the ledges, 34, note FIG. 5.

The flange 44 is fashioned along one edge with an extension 46 suitable to serve as a mount for a handle 48 so that the griddle 20 may be easily manipulated. Further, the extension 46 serves to at least partially block smoke flow toward the griddle handle.

In operation, as best illustrated in FIG. 6, the griddle 20 is positioned upon an open grid 16 of a conventional charcoal grill. The food (not shown) is placed upon the upper surface of the griddle 20 and the cooking and smoking cover 22 is positioned over the griddle, supported at the corner locations thereof as particularly illustrated in FIGS. 1 and 5.

Heat generated by a fire within the grill basin 12 will serve to cook the food resting upon the upper surface of the griddle 20. Moreover heat will be reflected onto the upper surface of the food, as is illustrated by directional arrows 50, from the heat reflective inner surface of the cover 22. As the food is cooked, grease and the like will tend to drip through apertures 42 in the griddle onto the open fire and immediately begin to smoke. The smoke thus generated will travel upwardly through the apertures 42 as illustrated by direction arrows 52 into surrounding relationship with respect to the food being cooked upon the griddle 20. The cover 22 will entrap the smoke and circulate the smoke about the food during cooking in order to impart a smoky taste thereto.

The smoke as indicated by directional arrows 54 tends to be circulated about the food and then is permitted to vent out of the lateral edges of the cover 22 through recesses 28. By the provision of openings only in the lateral surfaces of the cover 22 the smoke is effectively maintained around the food during cooking.

In order to facilitate flow of the smoke the peripheral flange 44 extending about the griddle 20 tends to be outwardly bowed along the sides thereof as at 56, note FIG. 8. This outward portion extends beyond the normally extending side walls 26 of the cover 22, note FIG. 6. Therefore smoke may be gently guided upwardly from the cover as indicated by flow arrows 58.

In order to readily manipulate the cover 22 with respect to the griddle 20 a knob 60 is connected to the centermost portion thereof. This knob may be connected to the plate 24 by a conventional centrally disposed threaded fasterner 62, which extends through the knob 60 and connects onto a compatibly threaded nut 64 which may be fixedly attached to the upper surface of the member 24.

The knob 60 is provided with a plurality of legs 66 radiating outwardly therefrom, note FIG. 2. The legs 66 are generally rectangular in cross-section and tapered along the length of the outer edge 68 from the outermost surface of the knob 66, outwardly to the end of the legs 70. Therefore, when the cover 22 is inverted as illustrated in FIG. 7, only the tips 72 of the outermost edges of legs 66 will contact the surface upon which the cover is resting to provide a stable base therefor.

In order to minimize heat conduction between the closed heat reflective member 24 and the legs 66 the legs are also tapered along the length of the inner edge 74 from the knob 60 outwardly to the ends 70 of the legs. The legs 66 are in supporting contact with the upper surface of the closed heat reflective member 24 only at the outer edges thereof as at 76.

Following the smoking and cooking operation the cover 22 may be inverted, as illustrated in FIGS. 7–9. The outer edges of the flange 44 are suitable to rest upon the inner edges of the corner ledges 34. The curved portions 30 of the side walls 26 exhibit a degree of resiliency so that the walls at the location of ledges 34 may be deflected slightly outwardly and thus an interference fit is provided between the griddle 20 and the cover 22.

When the cover 22 is thus inverted and the griddle is placed within the cover the unit may function to permit excess grease to drip from the food. Moreover the entire unit may be picked up by the handle 48 and the cover will cling to the griddle so that grease from the food will not drip upon the floor or table while the food is transferred from one location to another. Further, the stand will maintain the griddle in a convenient horizontal posture and the unit may be positioned directly upon an eating table to function as an attractive serving piece or the like.

While the above description of the cover 22 has been in combination with a griddle 20, it will be appreciated by those skilled in the art that the smoking and cooking cover 22 may be independently operable therefrom and in this connection may be placed directly upon a conventional barbecuing grid 16 and perform the functions of accentuating cooking and smoking of food in a highly advantageous manner.

SUMMARY OF THE MAJOR ADVANTAGES

In sum it will be appreciated that by the provision of the present invention an improved cooking and smoking apparatus has been provided which may be utilized with a conventional outdoor charcoal grill to highten the cooking and smoking qualities of outdoor barbecuing.

Further, the invention includes a novel combination of a griddle and a cooking and smoking cover which is operable to maximize the smoking character of an outdoor cooking operation while facilitating the handling of the food upon a conventional grill.

Moreover the subject invention provides a multifunctional apparatus which not only serves to heighten the smoking and cooking character of an outdoor barbecue grill but additionally may function as a grease collector and/or serving unit when not being utilized to cook the food.

A specific advantage of the invention lies in the novel smoking and cooking apparatus which permits smoke to vent therefrom only through the lateral edges thereof. Thus the smoking character of the unit is maximized.

By the specific structural interrelationship of the cover with the griddle the cover is operatively supported above the griddle during a smoking and cooking operation. Thereafter the cover may be inverted and resiliently connected to the griddle in an underlying posture to serve as a grease collector and serving stand.

Specifically, by the provision of the novel handle and stand configuration, heat from the cover will be isolated from the handle so that the cover may be removed from the griddle and inverted. In the inverted posture the cover may be stably supported upon a planar surface.

While the invention has been described with reference to preferred embodiments it will be appreciated by those skilled in the art that additions, deletions, modifications and substitutions, or other changes not specifically described may be made which will fall within the purview of the appended claims.

What is claimed is:

1. A smoking and cooking apparatus operable to overlay a cooking surface comprising:
   a closed heat reflective means;

support means connected to and downwardly extending from said closed heat reflective means for supporting said closed heat reflective means above a cooking surface, said closed heat reflective means in combination with said support means serving to reflect heat toward the cooking surface and to collect smoke above the cooking surface; and passage means laterally extending through said support means and comprising at least one recess fashioned from a free edge of said support means upwardly toward said closed heat reflective means for permitting smoke circulation within said apparatus.

2. A smoking and cooking apparatus as defined in claim 1 wherein:

said closed heat reflective means comprises a generally planar square shaped plate; and said support means comprise heat reflective side walls extending generally normally from the edges of said plate, said side walls having an equal extent so that said closed heat reflective means may be supported in a generally parallel horizontal plane above the cooking surface.

3. A cooking apparatus comprising:

a griddle including,
a heat conductive plate, and
upwardly extending flange means peripherally extending about said plate; and smoking and cooking means operably connected to said griddle including a closed heat reflective means;

support means connected to and downwardly extending from said closed heat reflective means for engagement with said flange means of griddle to reflect heat toward said griddle and collect smoke thereabove; and passage means laterally extending through said support means and comprising at least one recess fashioned from a free edge of said support means upward toward said closed heat reflective means for permitting in combination with at least a portion of said upwardly extending flange means smoke circulation within said cooking apparatus.

4. A smoking and cooking apparatus operable to overlay a cooking surface comprising:

a closed heat reflective means;

support means connected to and downwardly extending from said closed heat reflective means for supporting said closed heat reflective means above a cooking surface, said closed heat reflective means in combination with said support means serving to reflect heat toward the cooking surface and to collect smoke above the cooking surface;

passage means laterally extending through said support means permitting smoke circulation within said apparatus; and means connected to an upper surface of said closed heat relective means for serving as a handle when said support means is downwardly extending and for serving as a base suitable to maintain said apparatus in a stable posture when said apparatus is inverted and said support means is upwardly extending.

5. A smoking and cooking apparatus as defined in claim 4 wherein said means for serving as a handle and base comprise:

a knob connected to said apparatus in the center on the exterior surface of said closed heat reflective means, and a plurality of legs radiating upwardly from said knob along the exterior surface to the outer edge portions of said closed heat reflective means.

6. A smoker apparatus as defined in claim 5 wherein:

said legs are generally rectangular in cross section and tapered along the length of the outer edge thereof from the free end of said knob outwardly to the end of said legs whereby upon inverting said apparatus and placing said apparatus upon a generally planar surface the free end of said knob will be spaced above the planar surface.

7. A smoker apparatus as defined in claim 6 wherein:

said legs are also tapered along the length of the inner edge thereof from said knob outwardly to the end of said legs and into supporting contact with the upper surface of said closed heat reflective means whereby an air gap is maintained between the upper surface of siad closed heat reflective means and the inner edge of said legs to minimize heat transfer into said legs from said closed heat reflective means.

8. A smoking and cooking apparatus operable to overlay a cooking surface comprising:

a closed heat reflective means, including
a generally planar square shaped plate;

support means connected to and downwardly extending from said closed heat reflective means for supporting said closed heat reflective means above a cooking surface, said closed heat reflective means in combination with said support means serving to reflect heat toward the cooking surface and to collect smoke above the cooking surface, said support means including heat reflective side walls extending generally normally from the edges of said plate, said side walls having an equal extent so that said closed heat reflective means may be supported in a generally parallel horizontal plane above the cooking surface; and passage means comprising recesses fashioned generally along the midspan portions of said side walls from the free edges thereof toward said planar square member for permitting smoke circulation within said apparatus.

9. A cooking apparatus comprising:

a griddle including,
a generally square shaped heat conductive plate, and
upwardly extending outwardly bowed flange means peripherally extending about said plate; and
smoking and cooking means operably connected to said griddle including
closed heat reflective means comprising a generally square shaped heat reflective plate,
support means comprising heat reflective side walls connected to and downwardly extending normally from the edges of said heat reflective means for engagement with said flange means of said griddle to reflect heat toward said griddle and collect smoke thereabove; and
passage means comprising recesses fashioned generally along the midspan portions of said heat reflective side walls from the free edges thereof toward said heat reflective plate for acting in combination with said outwardly bowed flange means to permit smoke circulation within said cooking apparatus.

10. A cooking apparatus as defined in claim 9 and further comprising:
an upwardly extending extension member connected at a midspan location to said flange means along one side of said griddle and being dimensioned to substantially block flow through one of said recesses within the reflective side walls of said cooking and smoking apparatus which is positioned adjacent said extension member; and
a handle connected to said extension member and generally normally projecting therefrom to enable the cooking apparatus to be conveniently manipulated.

11. A cooking apparatus as defined in claim 9 and further comprising:
ledge means fashioned generally at the junction locations of said heat reflective side walls for providing abutting engagement of said heat reflective side walls with the upper edge of said griddle flange means generally at the corner location thereof whereby said closed heat reflective means may be supported above said griddle.

12. A cooking apparatus as defined in claim 11 and further comprising:
means connected to the upper surface of said heat reflective plate for serving as a handle when said smoking and cooking means is positioned on top of said griddle and for serving as a base when said smoking and cooking means is positioned beneath said griddle.

13. A cooking apparatus as defined in claim 12 wherein:
said heat reflective side walls, at the junction locations thereof are resilient and dimensioned to interferingly engage the corner portions of the flange means of said griddle when said smoking and cooking means is positioned beneath said griddle.

14. A cooking apparatus comprising:
a grill including,
a basin means for enhousing heat generating means,
support means for supporting said basin above a ground surface, and
a griddle operably supported upon the grid of said grill including,
a heat conductive plate; and
upwardly extending flange means peripherally extending about said heat conductive plate; and
smoking and cooking means operably connected to said griddle including,
a closed heat reflective means,
support means connected to and downwardly extending from said closed heat reflective means for engagement with said flange means of said griddle to operably connect said closed heat reflective means to said griddle to reflect heat toward said griddle and collect smoke thereabove, and
passage means laterally extending through said support means and comprising at least one recess fashioned from a free edge of said support means upwardly toward said closed heat reflective means for permitting smoke circulation within said cooking apparatus.

15. A cooking apparatus as defined in claim 14 wherein:
said heat conductive plate of said griddle is fashioned with a plurality of aperture means to establish fluid communication between an upper surface of said heat conductive plate and the basin of said grill.

* * * * *